United States Patent Office 3,442,379
Patented May 6, 1969

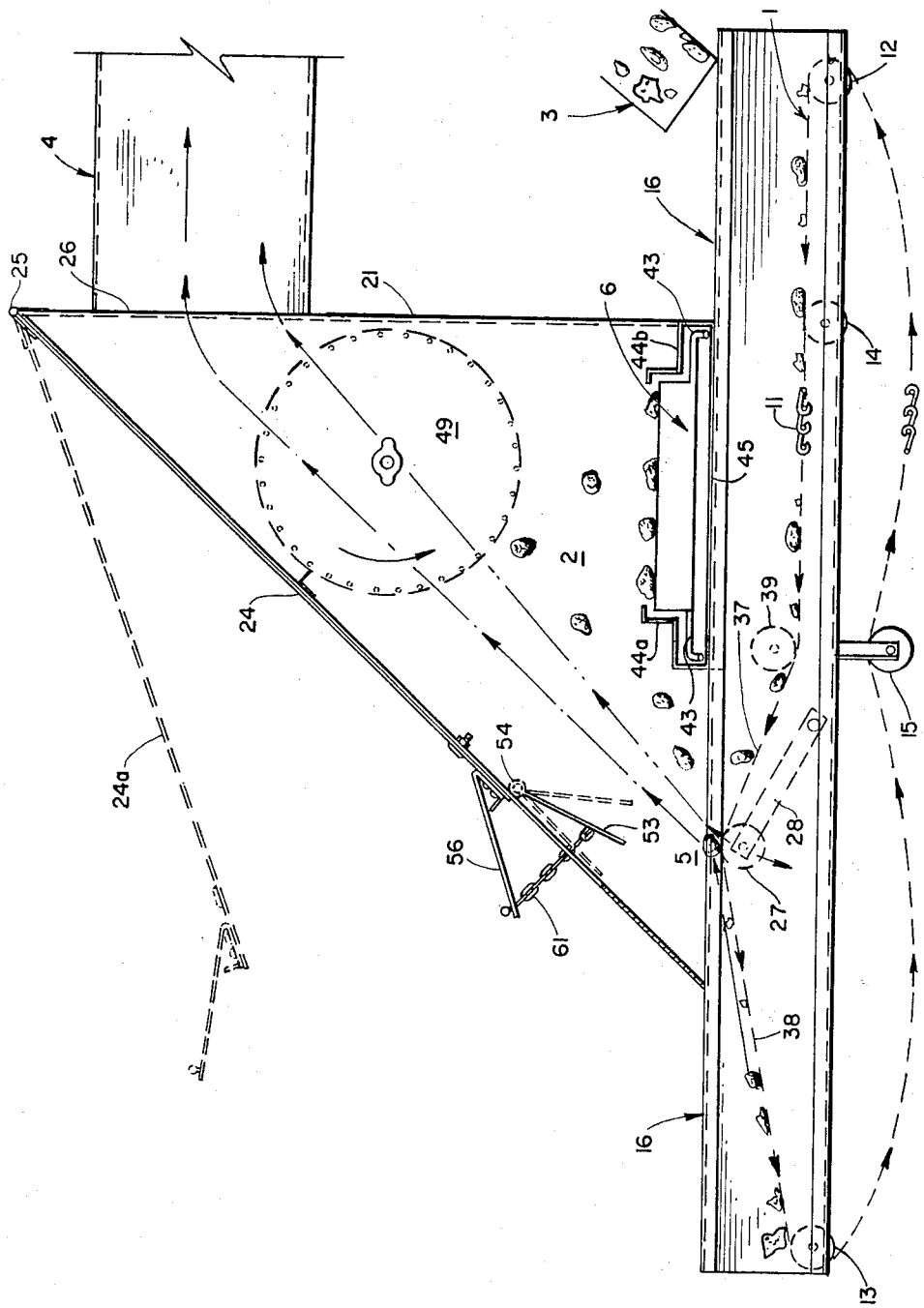

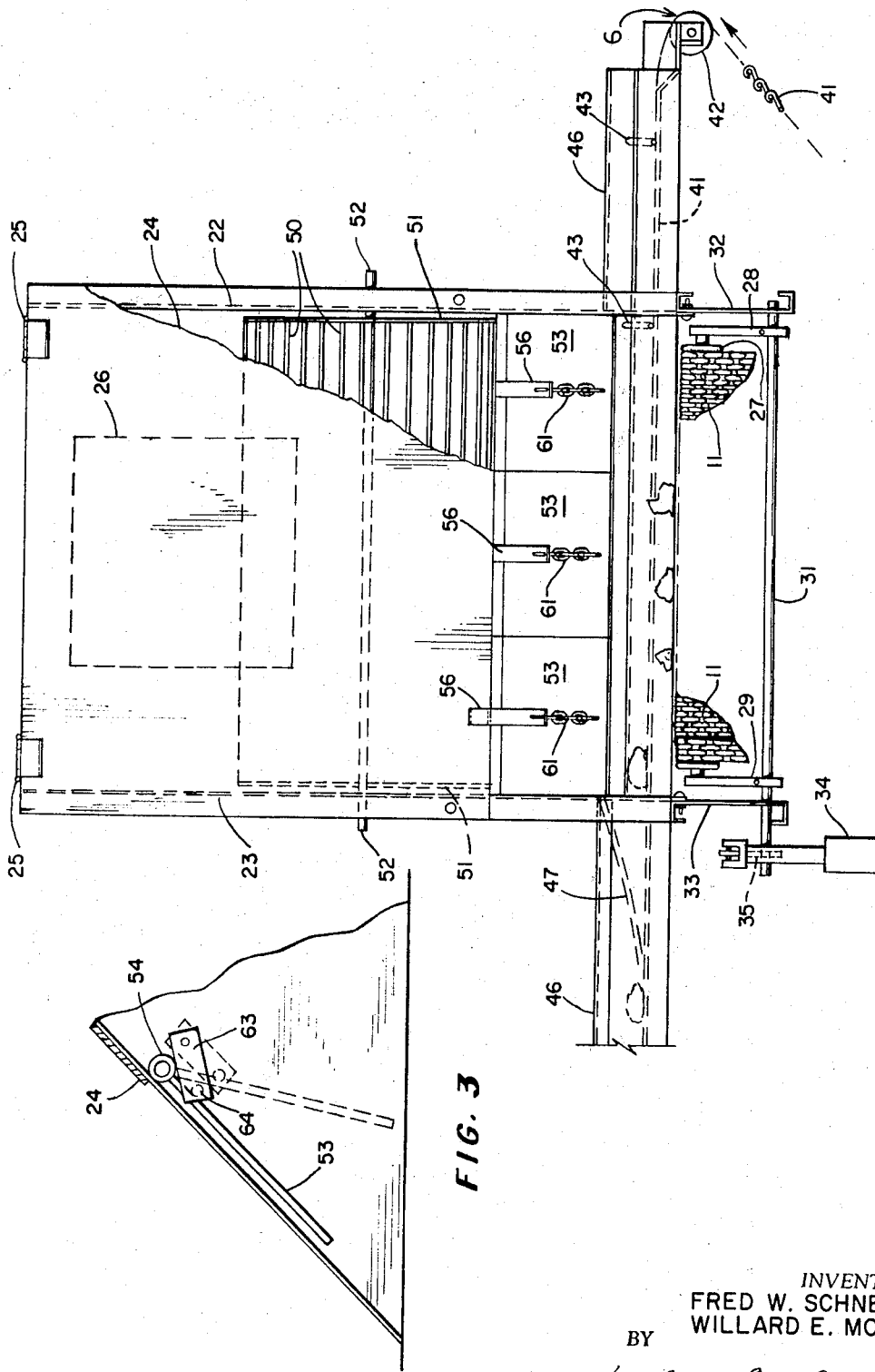

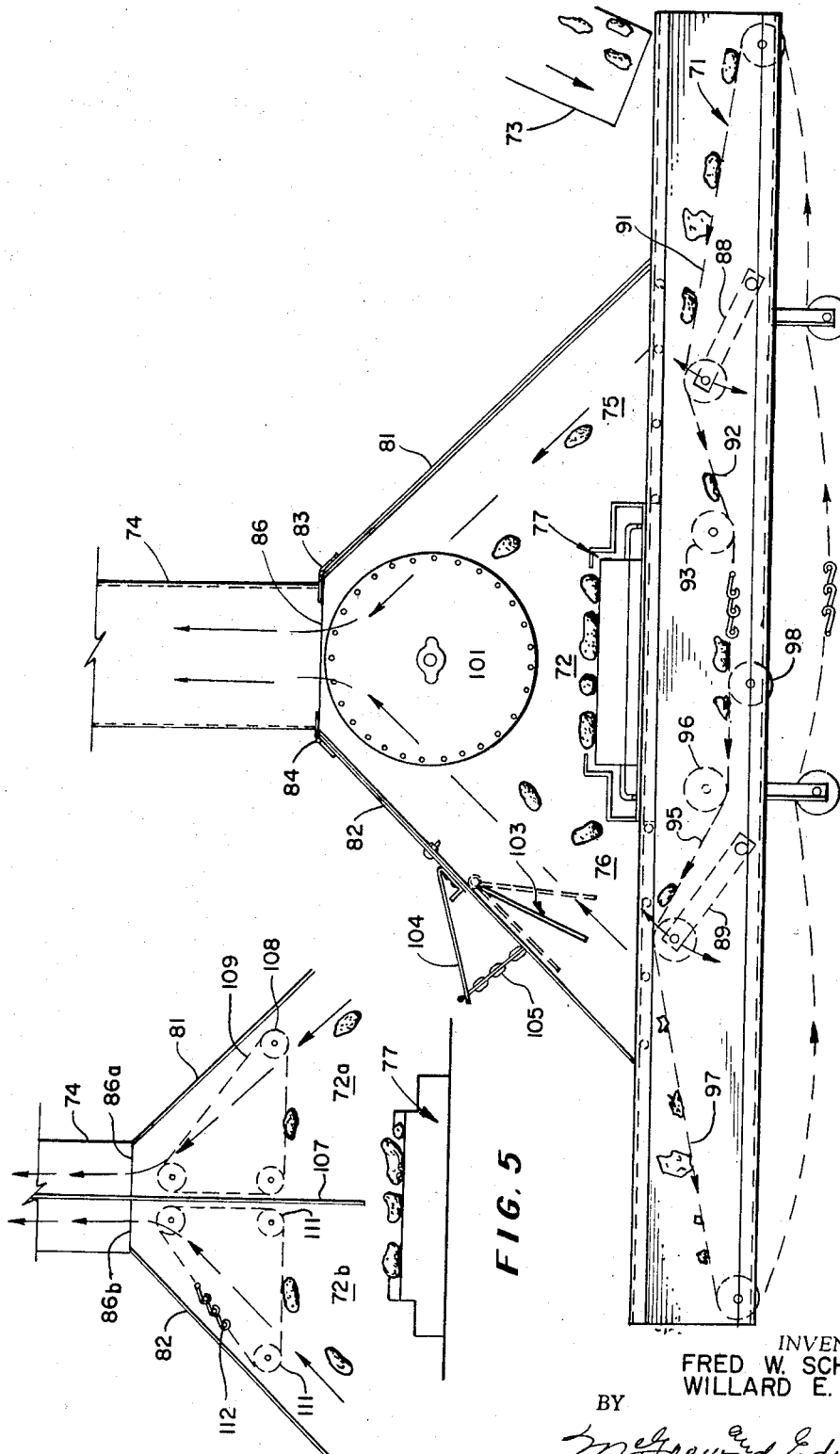

3,442,379
AIR SUCTION SEPARATOR FOR HARVESTERS
Fred W. Schneider, Mitchell, and Willard E. Morris, Gering, Nebr., assignors, by mesne assignments, to Lockwood Corporation, Gering, Nebr., a corporation of Delaware
Filed Aug. 11, 1966, Ser. No. 571,868
Int. Cl. B07b 4/08, 3/12
U.S. Cl. 209—137     4 Claims

ABSTRACT OF THE DISCLOSURE

An apparatus for separating vegetables such as potatoes from rock contaminants including air suction chamber, feed conveyor for moving feed mixture in underlying relation to chamber air inlet having adjustable inclined stretched at air inlet, takeaway conveyor in chamber above feed conveyor onto which vegetables are elevated by a suction effect, and improved sectioned flap member forming extension of wall bordering inlet pivotally mounted for free swinging movement of each section in one direction to provide clearance for oversize contaminants and adjustable stop for each flap section to limit inward swing to one of plurality of settings to change area of air inlet to vary the suction effect on vegetables. Foraminous member in chamber above takeaway conveyor to direct elevated potates onto takeaway conveyor. Another form has dual air inlets disposed along feed conveyor between transverse takeaway convoyer with at least downstream inlet employing said improved sectioned flap member and arcuate foraminous vegetable directing member above takeaway conveyor.

---

This invention relates to air suction separators and more particularly to improvements in air suction separators of harvesters for root and bulb type vegetables which grow below the soil surface, such as potatoes and the like.

Vegetables grown below the soil surface such as potatoes, onions, and the like, are presently being harvested by agricultural machinery which moves along the planted row usually removing leafy material in a topping action in advance of digging the vegetable from the soil and separating it from associated earthy matter followed by elevating and cleaning functions performed during progressive movement through the harvester and prior to delivery of the vegetables in a relatively clean condition to a point of discharge onto a vehicle such as a truck box or the like for their transport from the field.

In many of the growing areas when such crops are raised commercially the upper layers of the soil surface of the cultivated fields contain substantial quantities of rock which are carried along with the uprooted potatoes in the digging operation and require separation from the potatoes preferably prior to their delivery from the harvester, or at some other stage prior to bagging or packaging.

Various types of separators including air separators which relay on the difference in the specific gravities of the vegetables and the contaminants such as field rock and leafy material have heretofore been employed. Presently available air separator apparatus has not proven entirely satisfactory for all applications because of too high a potato content discharging with the waste rock and to a lesser extent because of a too high rock content in the separated potatoes.

Accordingly, it is an object of this invention to provide an improved air separator for separating vegetables such as potatoes and the like from rock contaminants.

Another object of this invention is to provide a novel flap member for the control of the air intake into the suction chamber of an air separator.

It is a further object of this invention to provide an elevating component of movement to potatoes mixed with the rock traveling on a conveying surface to facilitate their elevation when contacted by the air stream being drawn into the suction chamber.

Other objects, advantages and capabilities of the present invention will become apparent from the following description taken in conjunction with the accompanying drawings in which:

FIG. 1 is a side elevation view partially in section to show interior parts of an air separator having a single air suction intake and embodying features of this invention;

FIG. 2 is an end elevation view of the air separator shown in FIG. 1 as viewed from the downstream side of the feed conveyor with a portion of the chamber wall broken away to illustrate interior parts;

FIG. 3 is a fragmentary side elevation view partially in section of an alternative arrangement for positioning and limiting the inward movement of a sectional flap member of the suction chamber intake located at the downstream end of the feed conveyor;

FIG. 4 is a side elevation view partially in section to show interior parts of another form of air separator embodying features of this invention having air intakes into the suction chamber at the upstream and downstream ends of the feed conveyor; and FIG. 5 is a fragmentary side elevation view partially in section of an alternative form of foraminous member and baffle disposed in the air stream within the suction chamber for directing the potatoes elevated at upstream and downstream points onto the feed conveyor as shown in FIG. 4 and having dual air suction passages.

Referring now to the drawings and particularly FIGS. 1 and 2 there is shown an air separator herein referred to as the single air intake form. This separator, usually a component of harvester equipment, includes a generally horizontal feed conveyor 1 above which there is supported an air suction chamber 2. A suitable feed member such as a conveyor or chute 3 delivers a mixture of rock and harvested vegetables, hereinafter referred to as potatoes, onto the upstream end of the feed conveyor 1. An air duct 4 is provided at the upper end of the chamber 2 which is connected to a suitable air moving source such as a gas engine or other motor-driven blower (not shown) to draw a stream of air (indicated by arrows) through the chamber 2 and provide an air suction effect at the bottom air intake opening 5 in the chamber. Potatoes which are being moved by the feed conveyor advance to a position below and in proximity to the intake opening 5 and are drawn by the air stream intake upwardly from the supporting surface of conveyor 1 and pass into the interior of chamber 2 and remain airborne until directed onto the upper surface of a takeaway conveyor 6 which is disposed above feed conveyor 1 within chamber 2 to discharge the collected and separated potatoes in a course of travel transverse to the direction of feed conveyor 1.

The feed conveyor 1 comprises a conveyor member 11 supported in an endless configuration by pulleys 12 and 13 at each end, one or a plurality of upper intermediate pulleys 14 and one or a plurality of lower intermediate pulleys 15 for the return stretch.

The conveyor member 11 is illustrated as a draper chain rod assembly which forms a substantially foraminous supporting surface through which finer rock and said contaminants may pass prior to the advance of the potatoes beneath the chamber intake opening 5 and which provides a sufficiently irregular surface to carry the potatoes and rocks up the incline on its upper surface as hereinafter described. An alternative arrangement for the draper chain is to provide as the endless conveyor member 11 a rubber belt or the like having a substantially tacky exposed surface. A base member 16 is provided for the air separator chamber substantially covering the exterior surfaces of the feed conveyor except at intake opening 5, and provides a support for the conveyor pulleys 12, 13, 14 and 15.

The air separator chamber 2 supported above the feed conveyor 1 includes an upright front wall 21, side walls 22 and 23 and an inclined rear wall 24 supported on base member 16. The rear wall 24 tapers inwardly toward the top and terminates in the hinged connection 25 of a pair of spaced hinges at the top of the front wall 21 so as to pivot the rearward wall 24 upwardly (as shown in broken lines at 24a) and provide access to the interior of the chamber for clean-out and repair purposes. These upright chamber walls form the bottom intake opening 5 which is disposed above a downstream portion of the feed conveyor carrying surface. At the top of the front wall 21 there is provided a discharge opening 26 in communication with the air duct 4 which is the blower intake.

A hump-forming arrangement for engaging the undersurface of the conveyor member 11 is provided which includes a roller 27 rotatably supported on spaced end arms 28 and 29 which are secured oppositely of the roller connection by a common shaft 31 rotatably supported on the side walls 32 and 33 of base member 16. A force applying member, preferably a hydraulic cylinder 34, has its piston arm coupled to the shaft 31 by link 35 so as to rotate the shaft and pivot the arms 28 and 29 and associated roller 27 about the axis of shaft 31 to vary the elevation of roller 27. Roller 27 is positioned by arms 28 and 29 to engage the undersurface of the endless conveyor member 11 below intake opening 5 to elevate it above the remainder of the substantially horizontal upper stretch of the conveyor member so as to form a hump or upwardly inclining portion 37 between a hold-down roller 39 engaging the upper surface of the conveyor member and roller 27 and a downwardly declining portion 38 extending between roller 27 and pulley 13. This upwardly inclining stretch portion 37 imparts a tumbling effect to the advancing potatoes due to their tendency to roll down the incline which exposes potatoes previously covered by the associated rock and the rolling movement assists their elevation from the conveyor member surface as they pass under the intake opening 5 within the suction influence of the suction chamber 2. The slope angle of upwardly inclining portion 37 is substantially greater than the slope angle of downwardly declining portion 38 which narrows the gap between the lower edge of wall 24 and the conveyor surface.

The takeaway conveyor 6 comprises a conveyor member 41 supported by a pulley assembly in an endless configuration with only a portion of the conveyor member 41 and the upstream pulley 42 illustrated. The conveyor member 41 may be made as a draper chain rod assembly as is conveyor 1 and provided with a flight of members 43 preferably of rubber arranged at intervals along the conveyor (FIG. 3 two shown) and of greater length than the associated chain rods which form the conveyor so as to extend beyond each end of the chain rods a substantial distance (FIG. 1) or the conveyor may be a rubber belt having a tacky upper surface.

Conveyor 6 is located within an enclosure member inclusive of opposing side wall portions 44a and 44b and a bottom wall portion 45 encompassing the sides and bottom, respectively of the conveyor, leaving the upper surface of the conveyor member 41 open to the chamber 2. A top portion 46 extends beyond each side wall of the chamber to cover the top of the conveyor 6 in spaced relation thereto outside the chamber. Wall portion 44b forms one wall of the intake opening 5 and roller 39 is disposed below this wall portion. A flexible flap member 47 is supported from the chamber side wall 23 and engages the upper surface of the conveyor member 41 to assist in sealing the air suction chamber during discharge of the potatoes from the chamber on conveyor 6.

A foraminous member 49, herein illustrated as essentially a squirrel-cage assembly, is disposed within the chamber 2 above the take-away conveyor 6 and the intake opening 5 in the flow path of the air stream. The squirrel-cage arrangement includes a plurality of circumferentially spaced rods 50 supported by heads 51 and a central shaft 52 which is mounted for rotation about the lengthwise axis of the cage in a counterclockwise direction to intercept airborne potatoes elevated in the air stream which are directed by a component of force imparted by the surface of rods 50 onto the upper surface of the take-away conveyor 6.

At the lower end of the rear chamber wall 24 there is disposed a sectional flap assembly, herein shown as three similar flap members 53 of equal dimension, which together form a lower extension of wall 24 and establishes the space between its lower end and the upper surface of the conveyor 11 through which a major portion of the outside air is drawn. Each flap member 53 is secured by a hinged connection 54 at its top end to the wall 24 so the three flap members may move independently through an arc about a common pivotal axis above the downstream portion of the feed conveyor. Each flap member 53 is only a minor portion of the width of the conveyor member 11.

Above the hinge connection 54 there is provided for each flap member 53 a rigid support member 56 which depends from the lower end of wall 24 in overhanging relation to its associated flap member. A connecting member 61 of adjustable length, preferably a link chain, is secured at one end to the swinging end of the flap member and at the other end to the support member 56 and limits the extent to which the flaps can be drawn inwardly of chamber 2 by the suction influence.

An alternate form for supporting the flap member 53 from interiorly of the chamber is illustrated in FIG. 3 wherein there is provided for each flap member 53 a pivotally supported arm 63 interiorly of wall 24 having a rod-like member 64 on its swinging end which engages the inner surface of the flap member 53 and pivots about its pivotal axis so as to support the flap member and permit it to swing outwardly when contacted by an oversize rock and limit its inward movement under the influence of the suction action.

In the complete sequence of operation for the apparatus of FIGS. 1-3, the mixed potatoes and rock are discharged onto the upstream end of the feed conveyor 1 through chute 3. On feed conveyor 1 the potato and rock mixture first travels along a substantially horizontal course on the upper surface of chain 11 and then progresses up the inclined portion 37 and over the hump peak, then downwardly on declining portion 38. The lighter round potatoes tend to roll back down the incline assisting in their separation from covering rock and exposing the entire surface to the suction action.

The air stream drawn from outside chamber 2 first passes in a generally horizontal inclined path between the gap formed by the lower ends of the flap members 53 and the humped conveyor surface at the intake opening of chamber 5, then assumes an upwardly inclined path into and through the foraminous member 49 and finally travels in a horizontal path into intake duct 4. This air stream produces a suction effect on the potatoes as they begin their progressive movement by the conveyor up the inclined portion 37 and a major portion of the potatoes are elevated from this surface into the air stream by the suction effect and thereby are separated from the rock which due to its greater specific gravity remains on the conveyor surface and passes over the hump and down the declining portion 38.

The elevated potatoes following the inclined path of the air stream are carried above the take-away conveyor where due to their weight or due to the directional component imparted by the foraminous member fall onto the take-away conveyor 6 by which they are carried from the chamber 2.

Potatoes which are not separated from the rock are not elevated from the stretch 37 pass over the hump and along the declining stretch portion 38 which due to its lesser slope than portion 37 and the positioning of the depending end of the flap member is subject to a strong suction influence which may draw potatoes into the air stream thereby separating them from the rock on the declining surface.

Smaller rock sizes passing over the hump clear the depending flap members 53 and are discharged at the downstream end of the feed conveyor 1. The oversize rock sizes carried over the hump may engage one or more of the flap members and individually pivot them outwardly until the rock clears and then the flap member returns to its selected setting controlled by its associated chain 61 under the influence of the suction action. This sectional flap arrangement thereby facilitates a more uniform suction effect by limiting the normal gap and only widening the gap to the extent a given flap member is pivoted by a discharging oversize rock.

Referring now to FIG. 4 there is shown another form of air separator herein referred to as the dual air intake form having a general structural arrangement similar to the form shown in FIG. 1 and including differences as hereinafter described. This embodiment in general includes a feed conveyor 71 of a similar endless chain configuration covered by a base member above which there is supported an air suction chamber 72 in combination with a feed chute 73 for delivering a mixture of rock and potatoes onto the upstream surface of the feed conveyor 71 and an air duct 74 extending from the top of the chamber and connected to a suitable air source. Air intake openings 75 and 76 are provided in the bottom of the chamber above upstream and downstream portions of the feed conveyor 11 and are hereinafter referred to as upstream and downstream intake openings which are divided by the take-away conveyor 77 similar in structure to that shown as 6 in FIG. 1 and having wall enclosure portions, the combination of which extends transversely and above the feed conveyor 71.

The air separator chamber 72 includes inwardly inclining front and rear walls 81 and 82 each of which tapers inwardly toward the top and terminates in forward and rearward hinged connections 83 and 84 in spaced relation for pivoting the walls outwardly to provide access to the interior in a manner similar to the rear wall of FIG. 1. The upper ends of walls 81 and 82 terminate in spaced relationship to form a top central discharge opening 86 in communication with duct 74 which discharges the air from the chamber.

A hump forming member 88 is provided for engaging the undersurface of the conveying member below air intake opening 75 and a similar separate hump forming member 89 is disposed below intake opening 76. These hump forming members are similar in construction to the roller 27 and arm 28 combination shown in FIG. 1 previously described and are separately adjustable in elevation by a force applying member as in FIG. 1.

Hump forming member 88 establishes an upwardly inclining portion 91 extending from the upstream end of the conveyor to the hump forming member 88 and a downwardly inclining portion 92 between the hump forming member 88 and an intermediate hold-down roller 93. Another hump forming member 89 establishes an upwardly inclining portion 95 extending from an upstream hold-down roller 96 to the hump forming member 89 and a downwardly inclining portion 97 between the hump forming member 89 and the downstream end of the feed conveyor 71. The hold-down rollers 93 and 96 above the conveying surface of conveyor 71 together with an intermediate pulley 98 below the conveying surface form an intermediate dip portion over which the rock and potatoes not elevated into the first suction intake pass prior to their ascent up the second upwardly inclining portion 95.

Within the central interior portion of the chamber 71 above the take-away conveyor 77 and directly below the discharge opening 86 there is provided a foraminous member 101 shown in the form of a squirrel-cage assembly similar in construction to assembly 49 of FIG. 1 which passes the stream of air and intercepts the potatoes in flight and directs them onto the take-away conveyor 77.

At the lower end of wall 82 there is provided a sectional flap assembly 103 similar in construction to the flap assembly of FIG. 1 previously described which forms a lower extension of the respective walls and defines an air intake space between its lower ends and the upper surface of the feed conveyor. The downstream flap members are each provided with an overhanging support 104 and connecting chain 105 arranged in the manner shown and described in FIG. 1 for permitting discharge of oversize rocks and control of the air intake through opening 76.

The sequence of operation for the apparatus of FIG. 4 is generally similar to that described in FIG. 1 with the mixture of potatoes and rock being first subjected to a suction action as they progress up the inclined portion 91 at opening 75. The potatoes then progress down inclined portion 92, along the bottom portion of the dip stretch and then up the inclined portion 95 where they are subjected to the suction action produced at intake opening 76. The potatoes are finally subjected to some suction action on the declining portion 97 and the rock is carried to the downstream end of conveyor 71 for discharge as waste. In this arrangement the potatoes which possibly may be covered by rock during the first suction action have an opportunity to roll free and be elevated by the second suction action.

An alternative suction arrangement for the dual air intake openings 75 and 76 is shown in FIG. 5 which includes a baffle or partition member 107 dividing the discharge duct into front and rear discharge openings and extending downwardly through the chamber 72 in a vertical plane terminating in spaced relation to the take-away conveyor 77 to divide the chamber into two air passages 72a and 72b which are provided with separate independent sources of air exhaust such as two blower and motor assemblies (not shown).

Passage 72a is provided with a foraminous member including three pulleys 108 disposed in an essentially right angle triangular configuration supporting for movement a draper chain rod assembly 109 with the hypotenuse of the pulley configuration substantially parallel to and closely adjoining the baffle member. The pulleys rotate to move the lower undersurface of the chain assembly toward the baffle member 107 so as to direct the potatoes elevated through opening 75 onto the take-away conveyor 77.

Similarly, passage 72b is provided with a foraminous member including three pulleys 111 disposed in a triangular configuration supporting for movement a draper chain rod assembly 112 similar to assembly 109 with the hypotenuse of the triangular configuration parallel to and closely adjoining the baffle member. These pulleys rotate to move the lower undersurface of the chain assembly toward the baffle member 107 so as to direct the potatoes elevated through opening 76 onto the take-away conveyor.

We claim:

1. An air separator for separating harvested vegetables from associated rock contaminants and the like, comprising a feed conveyor for moving harvested vegetables and rock contaminants along a substantially horizontal course, an air separator chamber having upright side walls tapering inwardly toward the top and terminating above the conveyor to form upstream and downstream air intake openings above the conveyor, means for drawing a stream of air upwardly through said intake openings and into a discharge passage in an upper portion of said chamber for elevating the vegetables from the conveyor into said chamber while leaving rock contaminants of a higher specific gravity on the conveyor, a hump-forming means arranged for establishing an upwardly inclining surface beneath each said intake opening and downwardly inclining surfaces intermediate the intake openings, a takeaway conveyor within the chamber arranged transversely of said feed conveyor and between said upstream and downstream air intake openings and above said feed conveyor for reception and discharge of the vegetables elevated into the chamber, a foraminous member disposed in said chamber in the path of said air stream and above said takeaway conveyor for directing the elevated vegetables in the air stream onto the takeaway conveyor, a sectional flap member forming an extension of the chamber wall bordering the downstream intake opening with its lower end in proximity to hump forming means, each flap section being hinged along a pivotal axis for independent free swinging movement about its axis in the downstream direction of the conveyor means during contact with oversize objects on the conveyor means to provide clearance therefor, said flap section being retractable by the suction action at said downstream intake opening, and adjustable stop means operatively associated with each said section to limit the movement of the flap member in the inward swinging movement under the influences of the suction action to one of a plurality of different set angular positions to change the area of said intake opening and thereby vary the suction effect on the vegetables carried by the conveyor means.

2. An air separator as set forth in claim 1 wherein said foraminous member is of a squirrel-cage configuration and mounted within the chamber to direct the elevated vegetables onto the takeaway conveyor.

3. An air separator as set forth in claim 1 wherein said foraminous member includes a pair of endless chain members mounted for movement in opposite directions above the takeaway conveyor.

4. An air separator as set forth in claim 3 wherein said endless chain members are separated by a partition member which divides the discharge passage so as to provide separate air streams entering through said upstream and downstream air intake openings.

References Cited
UNITED STATES PATENTS

| | | | |
|---|---|---|---|
| 989,233 | 4/1911 | Cornwall | 209—139 |
| 1,720,666 | 7/1929 | Coffey | 209—45 X |
| 2,095,385 | 10/1937 | Heisserman | 209—145 X |
| 2,138,529 | 11/1938 | Thys | 209—45 |
| 2,643,768 | 6/1953 | Eissmann | 209—135 |
| 2,653,712 | 9/1953 | Leighton | 209—139 |
| 2,717,077 | 9/1955 | Leighton | 209—139 |
| 2,899,139 | 8/1959 | Hardinge | 209—138 X |
| 3,005,547 | 10/1961 | Freeman | 209—134 X |
| 3,227,276 | 1/1966 | Leighton | 209—139 |

FRANK W. LUTTER, *Primary Examiner.*

U.S. Cl. X.R.

209—147, 154; 302—59